United States Patent [19]

Shenouda et al.

[11] Patent Number: 4,814,193

[45] Date of Patent: Mar. 21, 1989

[54] REDUCTION OF MICROBIAL POPULATION ON SURFACE OF FOOD MATERIALS

[75] Inventors: Soliman Shenouda, Tarrytown, N.Y.; Adolph Clausi, Cos Cob, Conn.; Ann M. Rogers, Rivervale, N.J.; Nabil El-Hag, Putnam Valley, N.Y.

[73] Assignee: General Foods Corporation, White Plains, N.Y.

[21] Appl. No.: 178,403

[22] Filed: Apr. 6, 1988

[51] Int. Cl.$^4$ ............................................. A23B 7/14
[52] U.S. Cl. .................................... 426/321; 426/335
[58] Field of Search ................ 426/321, 324, 333, 335

[56] References Cited

U.S. PATENT DOCUMENTS

| | | | |
|---|---|---|---|
| 1,098,006 | 5/1914 | Allen | 426/335 |
| 1,242,728 | 10/1917 | Schneible | 426/335 |
| 2,214,419 | 9/1940 | Jones | 426/335 |
| 2,559,459 | 7/1951 | Peebles | 426/321 |
| 3,328,178 | 6/1967 | Alderton | 426/335 |
| 3,754,938 | 8/1973 | Ponting | 426/321 |
| 3,904,774 | 9/1975 | Pymsza | 426/321 |
| 3,978,235 | 8/1976 | Schiro | 426/335 |
| 4,006,257 | 2/1977 | Kolk | 426/321 |
| 4,336,273 | 6/1982 | Lee | 426/321 |
| 4,504,504 | 3/1985 | Gaehring et al. | 426/321 |
| 4,532,156 | 7/1985 | Everest-Todd | 426/333 |

FOREIGN PATENT DOCUMENTS

| | | | |
|---|---|---|---|
| 1168924 | 6/1984 | Canada | 426/321 |
| 3624035 | 2/1987 | Fed. Rep. of Germany | 426/321 |
| 0037965 | 2/1985 | Japan | 426/321 |
| 1393893 | 5/1975 | United Kingdom | 426/321 |

*Primary Examiner*—David L. Lacey
*Assistant Examiner*—V. Manoharan
*Attorney, Agent, or Firm*—Sam D. Walker; Thomas R. Savoie; Daniel J. Donovan

[57] ABSTRACT

The present invention teaches a process for reducing the microbial population, in particular the pathogens, on the surface of food materials such as fruits and vegetables consisting of contacting the food material with a first aqueous medium having an acidic pH followed by transferring the food material to a second aqueous medium having a basic pH and washing the food material in tap water to remove the base residue on the surface of the food material.

10 Claims, No Drawings

REDUCTION OF MICROBIAL POPULATION ON SURFACE OF FOOD MATERIALS

FIELD OF THE INVENTION

The present invention is concerned with the reduction of the total population of microorganisms on the surface of foods. More particular, the present invention is concerned with treating the outer surface of food materials with acidic and basic pH washes sequentially to decrease the surface microbial population.

BACKGROUND OF THE INVENTION

The most common way of extending the freshness of food materials such as fruits and vegetables has been to subject said materials to heat such as blanching or in extreme cases sterilizing. The problem with heat treatment is that, the requisite amount of heat required for destroying the microorganism which cause deterioration of the food materials often times causes undesirable changes within the food material. For instance, in case of fruits and vegetables changes such a denaturaton of proteins; degradation of strarches; destruction of vitamins, flavor and color pigments will generally occur. The most severe degradation generally occurs in the canning of these food product. Canning exposes the product to drastic heat treatment which adversely affects the color, flavor and texture of the finished product.

To avoid heat treatment, attempts have been made to preserve fruits and vegetables by treatment with acids or alkalies. For instance, U.S. Pat. No. 1,098,006 by Allen teaches preserving food substances such as fruit and vegetable pulp by treating with hydrochloric acid followed by neutralizing with sodium bicarbonate prior to use. It is believed that processing in an acidic environment generally shortens the time the food material is thermally processed which in turn decreases product degradation due to heat created within the container. This treatment, however, still affects particularly, the flavor and color of the product. U.S. Pat. No. 3,328,178 by Gordon teaches treating the food material with an acid and restoring the food product to its original pH by neutralization prior to thermal processing. U.S. Pat. No. 2,214,419 by Jones treats the food material with an alkali followed by neutralization with an acid prior to thermal processing. Pretreatment is believed to be less detrimental since the conditions within the containers are neither acidic or alkaline. These references, however, still involve thermal processing which has negative effects on the product.

Other references of general interest as follows.

U.S. Pat. No. 3,814,820 by Busta et al discloses treating fruits and vegetables by washing in an aqueous detergent solution of a phosphate at a pH preferably from 8 to 9, followed by contacting the product with an aqueous sanitizing agent such as a hypochlorite and treating the product with a discoloration inhibitor such as ascorbic acid at a pH preferably from 5.8 to 6.5.

U.S. Pat. No. 2,417,932 by Kalmar discloses treatment of fruits and vegetables, particularly potatoes with an aqueous solution of a hypochlorite, followed by treatment with an aqueous solution of a reducing agent such as a bisulfite or a phosphite.

U.S. Pat. No. 1,242,728 by Schneible discloses pasteurizing green vegetables such as asparagus by immersion in an alkali solution.

U.S. Pat. No. 176,754 by Mefford et al discloses preserving fruits by subjecting the products to an atmosphere of sulphorous acid followed by drying.

None of the above references disclose the treatment of fruits and vegetable with acid shock followed by alkali shock.

It is, therefore, an object of the present invention to reduce the total population of microorganisms on the surface of fruits and vegetables without the use of heat treatment.

Another object of the present invention is to reduce the natural pathogens of food microflora.

Still a further object of the present invention is to reduce the microbial load thereby extending the shelf life of foods products at refrigeration temperatures.

SUMMARY OF THE INVENTION

The present invention is concerned with a process for reducing the microbial population on the surface of food materials without the use of heat treatment consisting of the steps of: contacting the food material with a first aqueous medium having a pH ranging from about 1 to about 4 for a time ranging from about 5 minutes to about 30 minutes and at a temperature ranging from about 40° F. to about 100° F.; transferring the food material to a second aqueous medium having a pH ranging from about 11 to about 13 for a period of time ranging from about 5 minutes to about 30 minutes at a temperature ranging from about 40° F. to about 100° F. followed by rinsing the treated food material with tap water prior to consumption. The effects of the present invention can also be accomplished by first contacting the fruits and vegetables with a base or alkali followed by contacting same with an acid.

DETAILED DESCRIPTION

The process of the present invention enables the reduction of microbial population including pathogens on the surface of food materials without certain undesirable flavor, texture, or color changes occurring with heat treatment. This reduction in microbial load works to extend shelf life of the food materials at refrigeration temperatures.

In the first step of the present invention the food material is contacted with an aqueous medium such as a water bath having a pH ranging from about 1 to about 4 and preferably from about 1 to about 2. It is preferred in the present invention, since food materials are involved to select a food grade nontoxic acid. Suitable acids include hydrochloric, nitric, sulphuric, phosphoric, acetic, etc. Phosphoric acid and lactic acid, however, is generally preferred. The acid is applied in aqueous solution for a time ranging from about 5 minutes to about 30 minutes and preferably from about 5 minutes to about 15 minutes. The effectiveness of this treatment is further dependent upon the temperature of the acidic medium. Typically, temperatures ranging from about 40° F. to about 100° F. and preferably from about 65° F. to about 85° F. are suitable. It is believed that by contacting the food material with aqueous acid medium affects the bacteria by changing the hydrogen ion concentration outside the cell and thus the integrity of the cell wall and/or membrane thereby increasing the permeability of the cell. The most effective results were obtained when the food material is contacted with the aqueous medium for a period of time ranging from 10 to 20 at a temperature ranging from 65° F. to 90° F. and concentration of from 0.1 to 0.5.

After the food material has been contacted with the acid to obtain the desired effect it is first washed to remove the acid residue from the surface [which if allowed to remain would neutralize the base] then transferred to a second aqueous medium having a alkali or basic pH. It should be noted that this is not a neutralization step but rather a transfer from a acidic medium to an alkaline medium, creating a pH shock about the surface of the food material. The particular alkali or base utilized is not critical but prefered bases include metal such as sodium, potassium or calcium. Suitable bases, however, include sodium hydroxide, potassium hydroxide, calcium hydroxide, sodium carbonate, potassium carbonate, sodium bicarbonate, potassium bicarbonate, disodium phoshate, etc. The pH of the alkali or base should generally range from about 11 to about 13 and preferably from about 12 to about 13. The length of time the food material remains in contact with the alkali or base should be sufficient to penetrate the cell wall of the bacteria causing an extreme change in the ionic concentration of the cell resulting in total distruction of the bacterial cell.

Suitable time generally range from about 5 to about 30 and preferably from about 10 minutes to about 20 minutes. The temperature of the aqueous alkaline or basic medium can also affect the effectiveness of the alkali or base treatment. Typically, temperatures ranging from about 40° F. to about 100° F. are suitable. However, the preferred temperature ranges from about 65° F. to about 90° F.

The food material is completely submerged within the acid or basic solution so that the entire surface area of the material comes into direct contact with aqueous medium. In the case of solid materials, particularly those with relatively impervious surfaces, the alkali or base residue on the surface can be removed by simply washing the surface with water.

As the concentration of the acid or base increases the bacterial population of the surface of the fruits and vegetables decreases. However, too high concentration will adversely affect the quality of the fruits and vegetables particularly color, such as bleaching and texture such as softness. The concentration of the acid medium is generally dependent upon the type of acid utilized. In the case of organic acids the concentration should generally range from 0.05% to 2.00%, and preferably from 0.1% to 0.2%. In the case of inorganic acid the concentration should generally range from 0.05% to 2.00% and preferably from 0.07% to 0.1%. The base utilized in the present invention has a concentration of about 0.1%. Base concentration above 0.2% generally affect the color of the fruits and vegetables.

The effect of the present invention can also be accomplished by first contacting the fruits and vegetable with the base followed by washing then contacting the same with an acid. The pH shock at extreme acid and extreme base is what is necessary to accomplish the log reduction, and not the sequence of addition. Typical fruits include apples, pears, peaches, avacado, etc., and typical vegetables include asparagus zucchini, parsley, snow peas, broccoli, water crest, carrots, red and green peppers, lettuce and tomatoes.

An important feature of the present invention is the fact that the treated product does not require subsequent processing, i.e. retorting, and can be stored at refrigeration temperatures for up to 21 days without spoilage.

The following tables further illustrate the storage stability of the treated food materials.

TABLE I

Effects of Acid Concentration
Vegetable: Asparagus
Acid pH: 2.1 @ 25° C. for 10 minutes.

| Log Reduction in Total Aerobic Counts | Concentration | | |
|---|---|---|---|
| | 0.1% | 0.5% | 1.0% |
| (a) Phosphoric | 0.59 | | 3.1 |
| (b) Sulfuric | 0.2 | 3.85 | 5 |

Even though the bacteriocidal effects of the higher concentration of acid appears to be very good, the appearance and textural attributes were significantly affected.

TABLE II

Effects of Base Concentration
Vegetable: Asparagus
Alkali pH: 12.32 @ 25° C. for 10 minutes.

| Log Reduction in Total Aerobic Counts | Concentration | | |
|---|---|---|---|
| | 0.1% | 0.5% | 1.0% |
| Sodium Hydroxide | 0.11 | 0.28 | 1.76 |

TABLE III

Effects of Temperature
Vegetable: Asparagus
Acid Concentration: 0.1% for 10 minutes.
Acid: Phosphoric

| Temperature | 10° C. | 25° C. | 90° C. |
|---|---|---|---|
| Log Reduction in Total Aerobic Counts | 0.48 | 0.78 | 1.38 |

TABLE IV

Effects of Time
Vegetable: Snow Pea
Acid pH: 1.0 sulphuric acid
Aklali pH: 12.0 sodium hydroxide

| | Acid Only | | Sequence | |
|---|---|---|---|---|
| | | | Acid | Alkali |
| | 10 Mins. | 20 Mins. | 20 Mins. | 10 Mins. |
| Log Reduction in Total Coliform Group | 0.21 | 0.91 | 1.20 | |
| Log Reduction in Total Aerobic Count | — | | 1.52 | |

TABLE V

Effects of Acid/Base Combination
Vegetable: Zucchini
Acid pH: 1.72 Sulphuric Acid
Aklali pH: 12.15 Sodium Hydroxide

| | Acid Only | Sequence |
|---|---|---|
| Log Reduction in Total Coliform Group | 1.65 | 1.98 |
| Log Reduction in Total Aerobic Count | 1.49 | 2.11 |

TABLE VI

Effects of Acid Base Combination with Time
Vegetable: Broccoli
Acid pH: 1.7 Sulphuric Acid
Aklali pH: 12.0 Sodium Hydroxide

| | 10 Mins. Acid | 5 Mins. Base | 10 Mins Acid/ 5 mins. Base |
|---|---|---|---|
| Log Reduction in | 1.65 | 0.45 | 2.28 |

TABLE VI-continued

Effects of Acid Base Combination with Time
Vegetable: Broccoli
Acid pH: 1.7 Sulphuric Acid
Aklali pH: 12.0 Sodium Hydroxide

|  | 10 Mins. Acid | 5 Mins. Base | 10 Mins Acid/ 5 mins. Base |
|---|---|---|---|
| Total Coliform Group Log Reduction in Total Aerobic Count | 1.03 | 0.57 | 1.83 |

A typical application of the present invention is in the treatment of fruits such as apples, pears, peaches, avacados, etc., and vegetables such as asparagus, zucchini, parsley, snow peas, broccoli, water crest, carrots, red and green peppers, tomatoes, etc.

The following example further illustrate the features of the present invention and is not intended to limit the scope of the invention in any way.

EXAMPLE

Zucchinis were washed free of dirt and extraneous matters (stems and leaves). The Zucchinis were then submerged in an aqueous bath of pH 1.5, while being agitated within the bath for maximum exposure. The zucchinis were kept submerged in the bath for 10 minutes, at which time they were removed, quickly rinsed with tap water and submerged in a second aqueous bath for pH 12.5. Again, the vegetables were kept submerged for 10 minutes at which time they were removed for final rinse with tap water prior to preparation as a meal component.

What is claimed is:

1. A process for reducing the microbial population on the surface of fruit and vegetable materials without the use of heat treatment and no neutralizing effect consisting of the steps of:
   (a) contacting the fruit and vegetable materials with a first aqueous medium having a pH ranging from about 1 to about 4 for a time ranging from about 5 minutes to about 30 minutes and at a temperature ranging from about 40° F. to about 100° F.;
   (b) transferring the fruit and vegetable materials to a second aqueous medium having a pH ranging from about 11 to about 13 for a period of time ranging from about 5 minutes to about 30 minutes and at a temperature ranging from about 40° F. to about 100° F. so as to create a pH shock about the surface of said fruit and vegetable materials; and
   (c) rinsing the treated fruit and vegetable materials with tap water prior to use.

2. A process according to claim 1 wherein the pH of the first aqueous medium ranges from about 1 to about 2.

3. A process according to claim 1 wherein the pH of the second aqueous medium ranges from about 12 to about 13.

4. A process according to claim 1 wherein the fruit is a member selected from a group consisting of apples, pears, peaches and avacados.

5. A process according to claim 1 wherein the vegetable is a member selected from a group consisting of asparagus, zucchini, parsley, snow peas, broccoli, water crest, carrots, red and green peppers, lettuce and tomatoes.

6. A process for reducing the microbial population on the surface of fruit and vegetable materials without the use of heat treatment and no neutralizing effect consisting of the steps of:
   (a) contacting the food material with a first aqueous medium having a pH ranging from about 11 to about 13 for a period of time ranging from about 5 minutes to about 30 minutes and at a temperature ranging from about 40° F. to about 100° F.;
   (b) transferring the food material to a second aqueous medium having a pH ranging from about 1 to about 4 for a time ranging from about 5 minutes to about 30 minutes and at a temperature ranging from about 40° F. to about 100° F. so as to create a pH shock about the surface of said fruit and vegetable materials; and
   (c) rinsing the treated food material with tap water prior to use.

7. A process according to claim 6 wherein the pH of the first aqueous medium ranges from about 12 to about 13.

8. A process according to claim 6 wherein the pH of the second aqueous medium ranges from about 1 to about 2.

9. A process according to claim 6 wherein the fruit is a member selected from a group consisting of apples, pears, peaches and avacados.

10. A process according to claim 6 wherein the vegetable is a member selected from a group consisting of asparagus, zucchini, parsley, snow peas, broccoli, water crest, carrots, red and green bell peppers, lettuce and tomatoes.

* * * * *